US006378941B1

(12) United States Patent
Opfer et al.

(10) Patent No.: US 6,378,941 B1
(45) Date of Patent: Apr. 30, 2002

(54) 30/40/30 SPLIT SEAT WITH ADJUSTABLE CENTER PORTION

(75) Inventors: John G. Opfer, Rochester Hills; Terrence Duncan, Kentwood; Leslie Griswold, Whitmore Lake; Mark A. Caye; Anthony J. DiSalvo, both of Allen Park; Kurt A. Seibold, South Lyon; Nick G. Xiromeritis, Southfield, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/463,071

(22) PCT Filed: Jul. 16, 1998

(86) PCT No.: PCT/US98/14646

§ 371 Date: Apr. 13, 2000

§ 102(e) Date: Apr. 13, 2000

(87) PCT Pub. No.: WO99/03377

PCT Pub. Date: Jan. 28, 1999

Related U.S. Application Data

(60) Provisional application No. 60/052,901, filed on Jul. 16, 1997.

(51) Int. Cl.⁷ .............................................. A47C 15/00
(52) U.S. Cl. ............. 297/257; 297/378.12; 297/188.04; 297/183.1
(58) Field of Search .................................. 297/232, 238, 297/257, 248, 344.1, 183.1, 411.32, 117, 113, 112, 118.04, 188.05, 378.1, 163; 248/429, 430

(56) References Cited

U.S. PATENT DOCUMENTS

| 193,459 | A | * | 7/1877 | Payne |
| 1,087,003 | A | * | 2/1914 | Engel |
| 1,752,368 | A | * | 4/1930 | Brunn |
| 2,678,681 | A | * | 5/1954 | Haltenberger |
| 3,258,289 | A | | 6/1966 | Malinowski .................. 296/65 |
| 4,354,791 | A | | 10/1982 | Antonellis |
| 4,807,932 | A | | 2/1989 | Hong .......................... 297/346 |
| 5,039,155 | A | | 8/1991 | Suman et al. .............. 296/65.1 |
| 5,286,084 | A | * | 2/1994 | Bart |
| 5,516,194 | A | | 5/1996 | Maule ...................... 297/284.1 |
| 5,636,884 | A | | 6/1997 | Ladetto et al. |
| 5,711,505 | A | | 1/1998 | Nemoto |
| 5,741,046 | A | | 4/1998 | Leuchtmann et al. |

FOREIGN PATENT DOCUMENTS

FR    556385    *  7/1923
GB   1054377        1/1967

* cited by examiner

Primary Examiner—Milton Nelson, Jr.
(74) Attorney, Agent, or Firm—Foley & Lardner

(57) ABSTRACT

A seating system (10) having a split bench seat (14, 16, 18) substantially divided in a 30%, 40%, 30% proportion with the 40% center portion (16) being adjustable in the fore/aft direction.

22 Claims, 5 Drawing Sheets

30/40/30 SPLIT SEAT WITH ADJUSTABLE CENTER PORTION

CROSS REFERENCE TO RELATED APPLICATION

This application claims the benefit of prior provisional application no. 60/052,901, filed Jul. 16, 1997.

BACKGROUND OF THE INVENTION

1. Technical Field

This invention generally relates to a seating system and, more particularly, to a seating system having a 30/40/30 bench seat wherein the center (40%) seat portion is adjustable in a fore/aft direction to provide a flexible seating configuration depending upon the occupant's needs.

2. Discussion

In many passenger vehicles the second row is often occupied by only a single occupant. At times, this occupant is an adult who would like to engage in conversation with both the driver and the front seat passenger. In many rear seats currently produced the seating configuration provides a greater portion of the seat at each outboard location with a somewhat smaller seating location located in the center of the second row seat. As such, if an adult is seated in the second row they must either sit directly behind the driver or the front seat passenger, making it more difficult to communicate with the person they are sitting directly behind, or they may elect to sit in the center seating position and sacrifice some comfort because of the smaller proportion that is allowed for the center seating position. Either condition is considered to be less than desirable.

If the second row passenger is an infant or young child who may need assistance during a trip from a front seat occupant it is often difficult for the driver or front seat passenger to reach the child that needs assistance in the second row seat if the child sits in one of the outboard seating locations. Further, when the infant or young child is located in an outboard seating location of the second row seat, the seat backs of the front seats tend to block the child's forward vision. If for example the front seats are bucket seats, as are common in many mid-sized and compact vehicles today, a child located in the center seating position of the second row seat can have improved forward vision thereby minimizing boredom and possible motion sickness which sometimes occurs. While a child seated in the center position of a second row seat is closer to the driver or front seat passenger it is often difficult because of the angle to reach the child to assist them.

The present invention is intended to overcome or minimize the above stated disadvantages of the current seating systems.

SUMMARY OF THE INVENTION

In accordance with the teachings of the present invention, a second or third row seating configuration is provided in which the seat is proportioned such that the outboard seating positions each receive approximately 30% of the seating area while the center seating position receives approximately 40%. Further, the 30/40/30 bench seat configuration of the present invention provides fore/aft adjustment of the 40% center seating position to provide flexibility for comfortable travel for an adult, an adolescent, or a child in a car seat.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature and is in no way intended to limit the invention, or its application, or uses.

Figure 1:
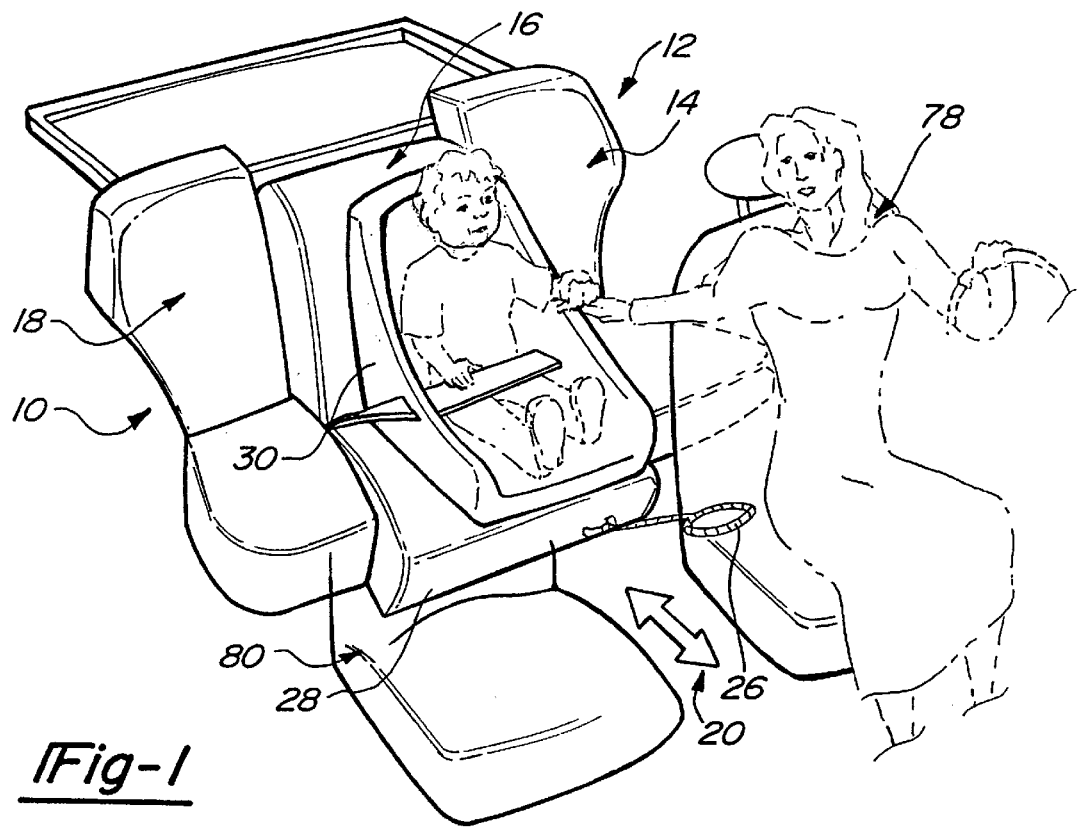
FIG. 1 is a perspective view showing a seating system made in accordance with the teachings of the present invention.

Referring to FIG. 1, a seat assembly 10 is shown within a vehicle body 12. Seat assembly 10 is a split bench seat having a driver side seat portion 14, a center occupant seat portion 16, and a passenger side seat portion 18. The relative proportion of the total width of seat assembly 10 for each of the seat portions is as follows: driver side seat portion 14 is approximately 30%; center occupant seat portion 16 is approximately 40%; and passenger side seat portion 18 is approximately 30%. While the seat portions have been identified in the preferred embodiment as being 30/40/30, it is within the scope of the present invention to include all seating proportions in which the center occupant seat portion 16 is larger than either of the outboard (driver side or passenger side) seat portions 14 or 18. While the preferred embodiment will for convenience, describe the outboard seat positions as being equal to one another it is within the scope of the present invention to include asymmetrical outboard seat portions. As such, the center seating position must be a minimum of 34% of the total width seat assembly 10 and can increase to any proportion possible provided the outboard seat portions provide sufficient dimensional width to qualify as a seating position as recognized in the industry or as required by governmental regulations.

The center occupant seat portion 16 of the present invention is movable in a fore and aft direction as shown by the arrow 20. Means for providing fore and aft movement can be achieved in numerous ways including, but not limited to a track system, a slide system, a guide mechanism, linkages, rollers, wheels, or a bearing system. Each system of device utilized will preferably provide means for securing center occupant seat portion 16 in one or more of the positions to be described below. Further, while the preferred embodiment will be described as providing forward and rearward motion (fore/aft movement) it is within the scope of the present invention to provide movement from a normal position to a forward position only, or from a normal position to a rearward position only. Normal position is a position in which the center occupant seat section is in a conventional bench alignment.

Figure 5:
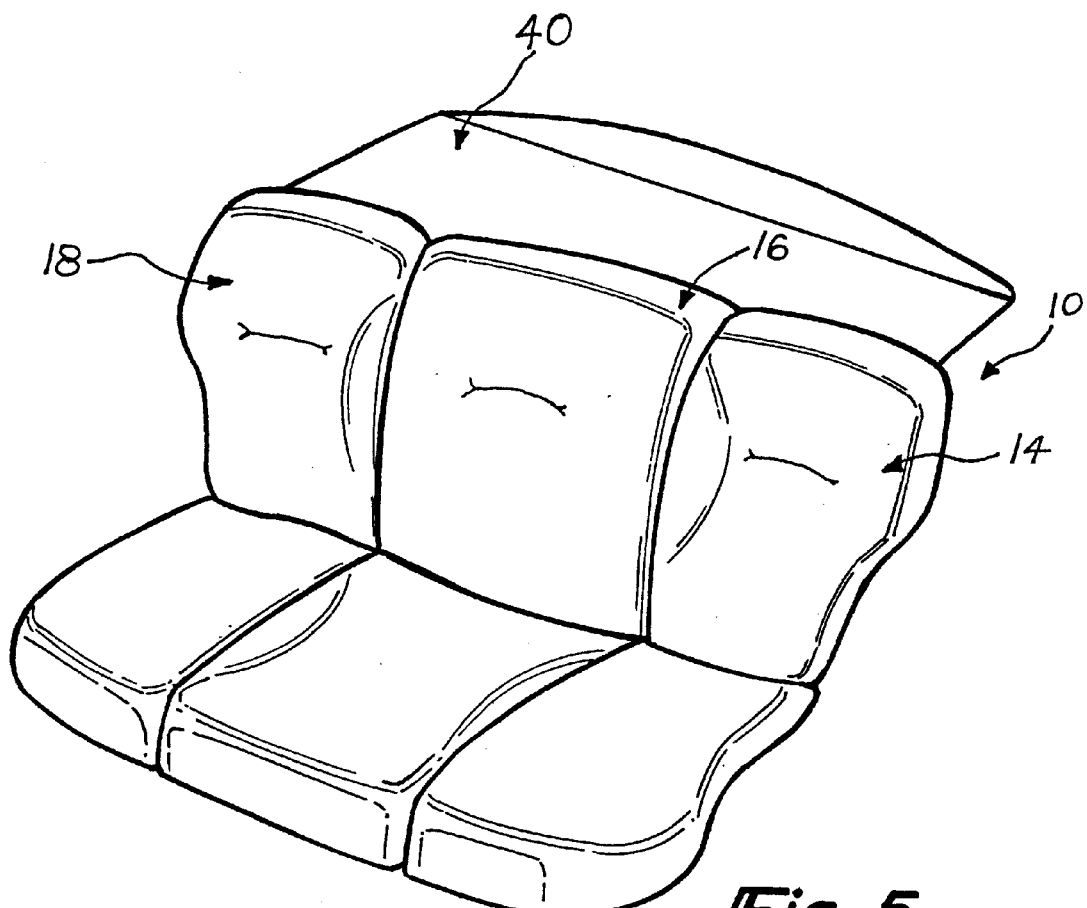
FIG. 5 is a perspective view showing the 30/40/30 seat of the present invention in the aligned bench position with the rear shelf in a coordinated position therewith.

As shown in FIG. 1, seat portion 16 is movable forward from a normal or first position as defined above and shown in FIG. 5. The forward position shown in FIG. 1 will also be referred to as either a second position or as a child position throughout the remainder of this application. A pull handle 26 is provided in the preferred embodiment to facilitate forward motion of center occupant seat portion 26 by either front seat occupant. The securing means is disengaged when pull handle 16 is urged forward, and is spring biased to re-engage when the handle is released and the seat portion 16 is in the child position. When the center seat portion 16 is occupied by a small child and minimal leg room is required forward of seat cushion 28, the seat portion 16 may be moved forward thereby providing improved access to the child by either of the front seat occupants. By moving seat portion 16 to the forward position the distance for the front seat occupant to attend to the child is significantly reduced and the angle is improved.

As shown in FIG. 1, the child may be seated in an after-market type child seat 30, or may alternately be seated in an integrated child seat (not shown) as is known in the industry. Young children not requiring a child seat but still requiring some attendance from a front seat occupant can move the center occupant seat portion 16 to a somewhat forward position which is midway between the normal position (shown in FIG. 5) and the full forward child position (shown in FIG. 1). The number of seat positions available and the total extent of travel from a full forward child position to a full rear adult position as defined below is not intended to be limited. Instead, depending on the geometry of the vehicle and the particular means for providing fore and aft movement of center seat portion 16 which is utilized, a near infinite number of positions are available. The travel of seat portion 16 can be from a position in which there is contact between seat cushion 28 and the front occupant's seat when in the full forward position, to a full rear position limited only by the track travel, the rear of the occupant compartment, or contact with any items which may be stored rearward of center occupant seat portion 16 in a storage area provided therebehind.

Figure 3:
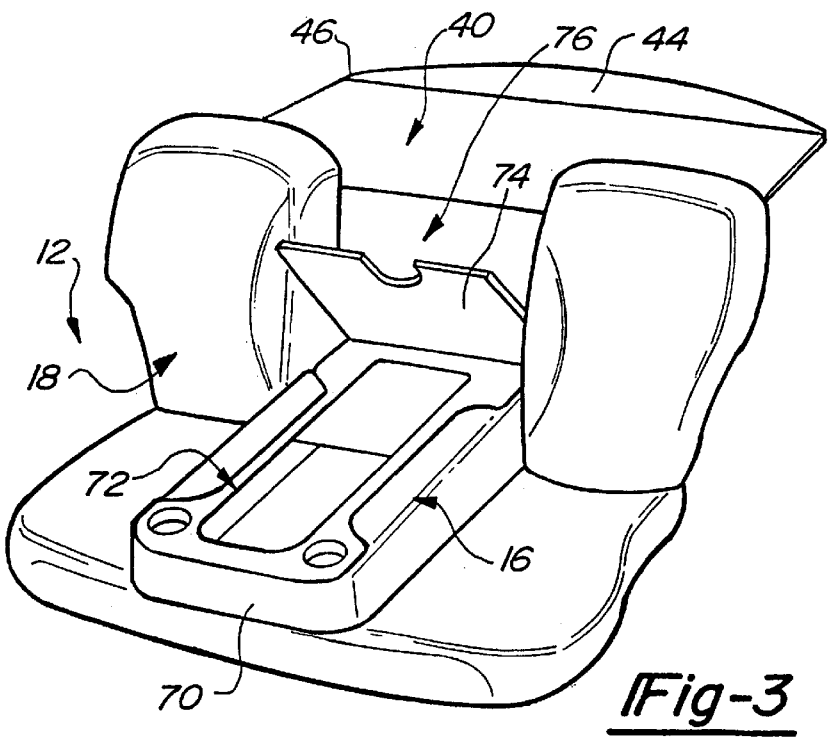
FIG. 3 is a perspective view of the 30/40/30 seat of the present invention having the seat back of a center seating position in a lowered position.
Figure 4:
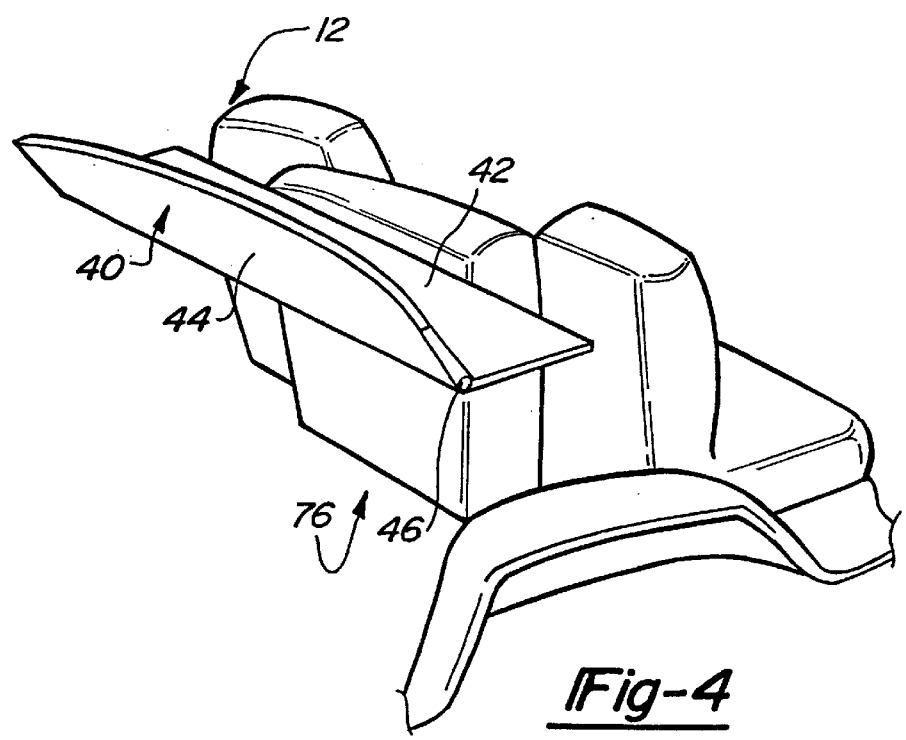
FIG. 4 is a perspective view showing the 40% center section displaced rearward in vehicle and the rear shelf in a coordinated position therewith.

With reference to FIGS. 3 and 4, the vehicle 12 is provided with a rear shelf 40 having a front portion 42 and a rear portion 44 coupled by a transverse hinge 46. Hinge 46 may be a variety of configurations including, but not limited to, a full width panel hinge, a molded living hinge, a cloth or carpet hinge (if the tray is so covered), or a detachable hinge or hinges which allow for the full separation of the front and rear portions. The two piece arrangement for shelf 40 as described, enables the shelf 40 to be folded as shown in FIG. 4. This enables center occupant seat portion 16 to move rearward within the vehicle body 12 while being unconstrained by the shelf 40 interfering with the structure of body 12 or any other vehicle components.

Figure 2:
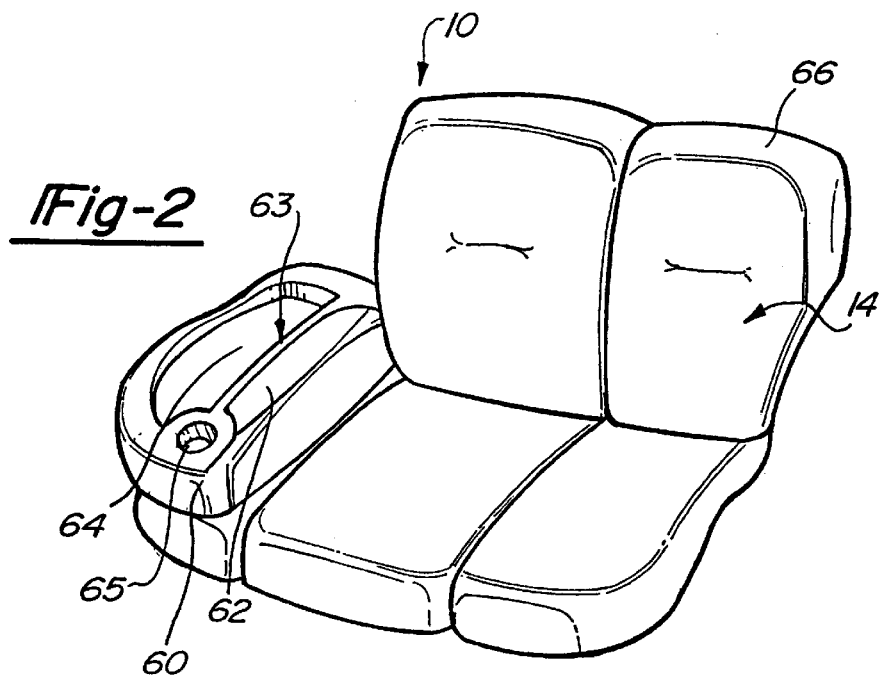
FIG. 2 is a perspective view of the 30/40/30 seat of the present invention having the seatback of an outboard seating position in a lowered position.

Referring to FIG. 2, seat assembly 10 is shown in its aligned or normal position with a seat back portion 60 of passenger seat portion 18 in a folded down orientation. With seat back portion 60 in the folded orientation, an armrest 62 is available for the center seat occupant. The armrest 62 can be formed in or a separate component added to the seat back surface 63. The seat back surface 63 may also include a work surface or as shown in FIG. 2, a tray configuration 64 and cup holder 65 for the convenience of a center seat occupant. While not specifically shown, seat back portion 66 of driver side seat portion 14 can be folded down similar to seat back portion 60 and can be equipped with similar or complementary amenities. It is noted that while the seat back 60 is shown in the downward position when the center seat portion 16 is in its normal fore and aft position, the seat back portions 60 and 66 may be folded to the downward orientation when seat portion 16 is in a partial or full forward or rearward position as well.

With reference to FIG. 3, the seat back portion 70 of center occupant seat portion 16 is shown in a downward position thereby creating armrests for the passengers seated in outboard seat portions 14 or 18. Again the seat back surface 72 of seat back portion 70 may provide storage or work surfaces, and further provides a close-out panel 74 which can be pivoted to an upward position to prevent noise from passing from a storage compartment 76 (FIG. 4) rearward of the seat assembly 10. If long objects, such as ski's or lumber, are carried in the vehicle 12, the close-out panel 74 may be folded forward and down thereby allowing clear access from the storage compartment 76, between the front seats 78 and 80 (FIG. 1), to the rearward edge of an instrument panel (not shown).

Figure 6:
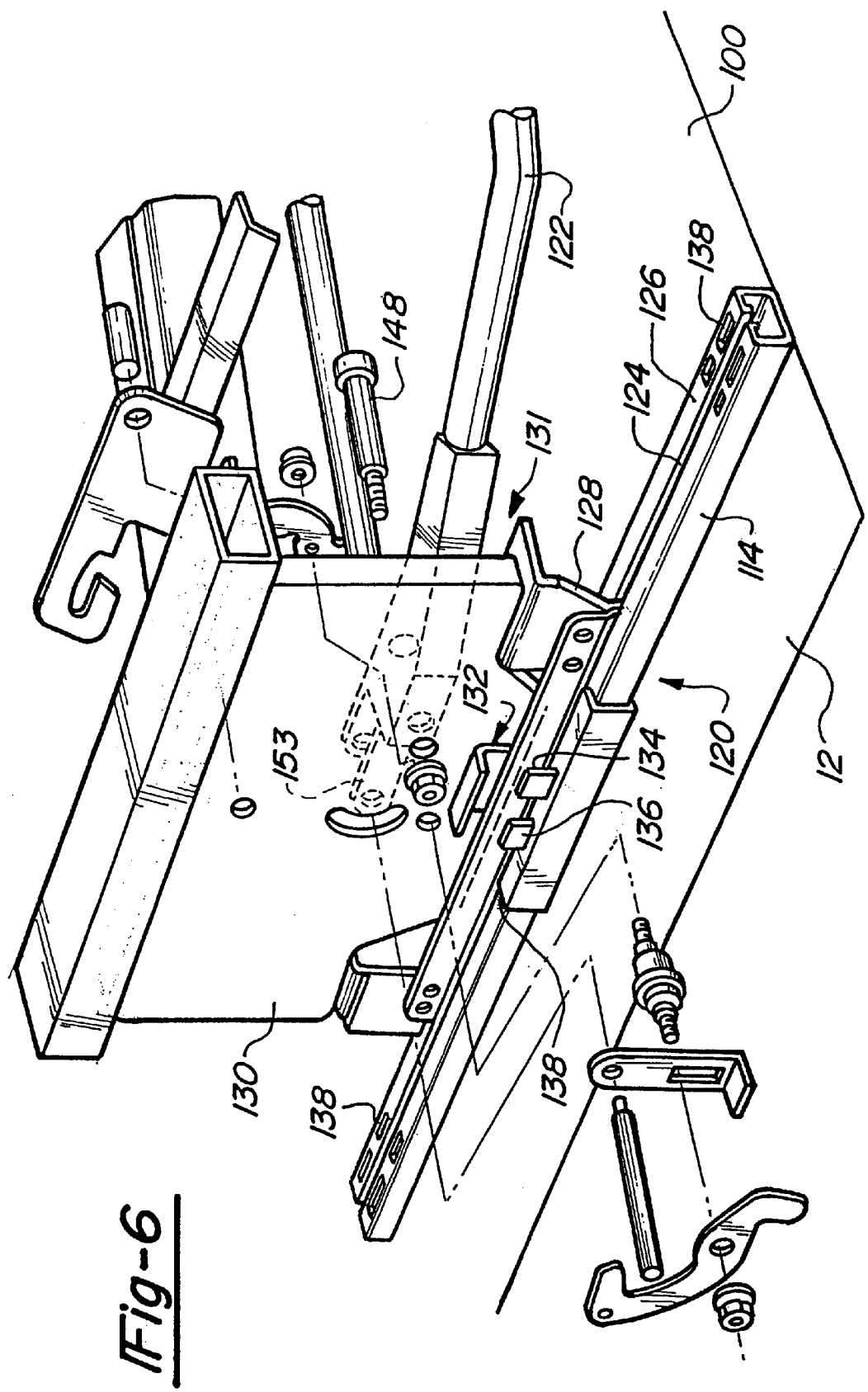
FIG. 6 is a perspective view of a preferred embodiment for providing fore/aft movement of the 40% center section of the present invention.

With reference to FIG. 6, the preferred embodiment of the device for providing fore and aft movement of center seat portion 16 is shown. Seat portion 16 is shown connected to a pair of elongated tracks 114 which are secured to floor 100 of vehicle 12. The tracks 114 may be attached to the floor 100 of the vehicle body 12 by a wide variety of methods including, but not limited to, bolting, screwing, welding, glueing, and bonding. While a manually operated type track system is shown, it is within the scope of the present invention to use a power seat track system, as known in the industry. Further, as previously stated, a multiple number of secured positions can be incorporated in track 114 and the total travel of the seat portion 16 is limited only by the geometry of the vehicle and the desirable limits of travel. For convenience, only one track I 14 is shown in FIG. 6. The other track is a similar construction and can either include a locking mechanism as described below or be a free floating slide rail if the locking mechanism is not required on both tracks.

Track 114 is shown to extend fore and aft in the vehicle. The track 114 is generally C-shaped in section having an open slot 124 in the top wall 126 of the track. Slide rail 128 is mounted to the track 114 for movement fore and aft along the length of the track 114 in a conventional manner for adjustable seats. Slide rail 128 extends upwardly through the slot 124. Attached to the slide rail 128 is a vertical riser 130. Depending upon the particular vehicle structure and the seating height required above the floor of the vehicle, riser 130 may be of any height. The slide rail 128 and riser 130 together form a slide car 131 which moves along the track 114 and forms a platform for seat cushion 28 and seat back portion 70 of center occupant seat portion 16. The latch 120 includes a seat latch pawl 132. The pawl 132 has upwardly extending teeth 134 and 136. The teeth 134 and 136 extend upward through apertures 138 in the top wall 126 of rail 114 at select locations in which center occupant seat portion 16 is intended to be secured. Release member 122 pivots about a shoulder bolt 148 which is secured to riser 130. A rearward portion 153 of member 122 pivots downward thereby lowering pawl 132 such that teeth 134 and 136 disengage apertures 138 and allow seat portion 16 to translate fore and aft along track 114.

Figure 7:
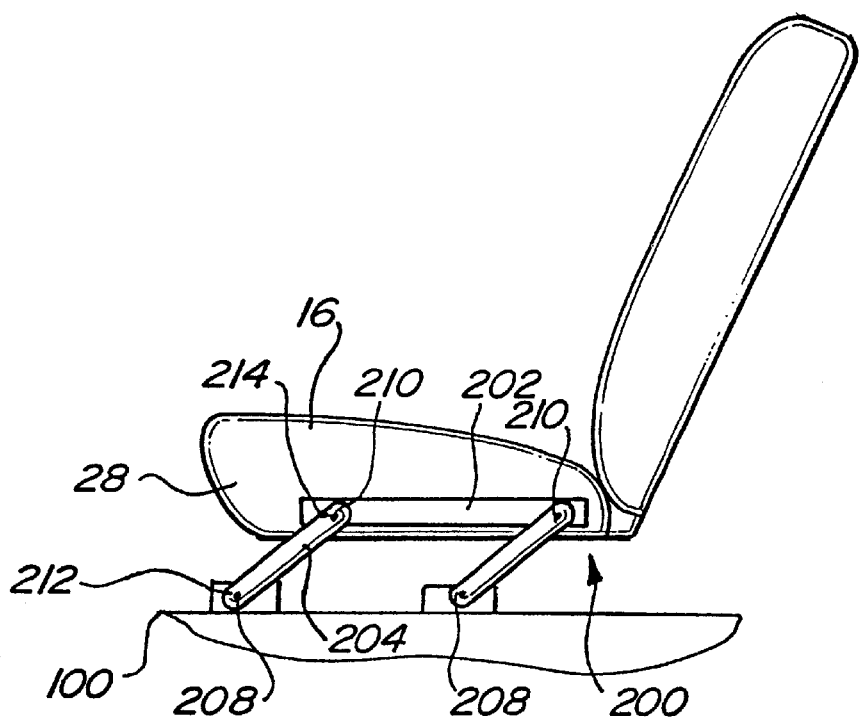
FIG. 7 is a side view of an alternate embodiment for providing fore/aft movement in a rearward position.
Figure 8:
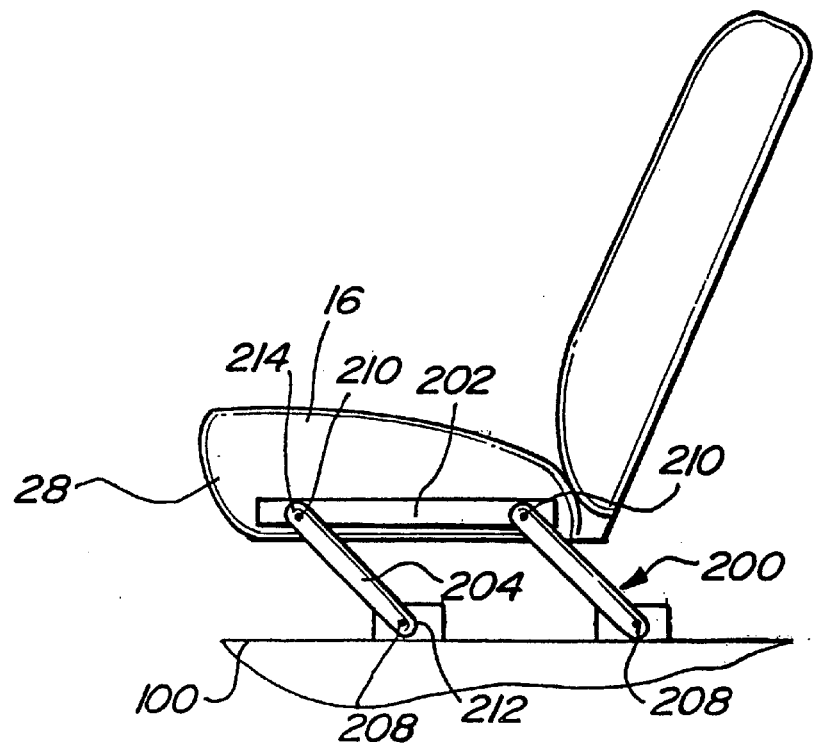
FIG. 8 is a side of the alternate embodiment in a forward position.

Referring now to FIG. 7, an alternate preferred embodiment of a device for providing movement of center seat portion 16 is shown. This alternate embodiment utilizes linkages and is intended to show an embodiment in which motion from the normal position is only provided only in one direction. The particular embodiment shown provides motion from a normal position to a forward position. As shown, center occupant seat portion 16 is connected to a four bar linkage mechanism 200. The four bar linkage mechanism 200 can be attached directly to the frame 202 of seat cushion 28 or can be connected to a separate sub-frame (not shown) which is then attached to seat cushion 28. Each of the bars 204 are pivotally secured to floor 100 and pivotally attached to the frame 202 of seat cushion 28. When in a normal position, the mechanism 200 is folded rearward with the floor mounted pivot end 208 forward in vehicle of the cushion mounted pivot end 210. When in a forward position, the cushion mounted pivot end 210 is forward of the floor mounted pivot end 208 as shown in FIG. 8. This configuration allows the seat to effectively be translated fore and aft a distance which is twice that of the distance between the floor mounted pivot axis 212 and the cushion mounted pivot axis 214 located on each bar. Alternately, it may be desirable to raise the level of the seat cushion 28 when in the forward child position such that the child is elevated and provided with a better view out the front window. In such a case, a stop means 218 mounted to the floor 100 of the vehicle 12 can be used to prevent the bar mechanism 200 from rotating to the same angle as it does rearwardly. The seat cushion 28 will be elevated because of the angle of the bars, when resting on the stop means 218, is greater than when regarded as referenced from the floor 100. A variety of stop means can be utilized and the floor mounted stop means is only one of may know in the art.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. A flexible seating system for a vehicle comprising:
   a seating assembly having a seat bottom having a total width, said seating assembly including two outboard seating means and a center seating means, said center seating means comprising at least 34% of said total width of said seat bottom and said outboard seating means each having a substantially equal width that is no greater than 33% of said total width of said seat bottom, each of said seating means having a seat back and a seat cushion; and
   a means for displacing said center seating means in a fore and aft direction relative to said two outboard seating means.

2. The flexible seating system of claim 1, wherein said center seating means comprises substantially 40% of the seating assembly and each of said two outboard seating means comprises substantially 30% of the seating assembly.

3. The flexible seating system of claim 1, wherein said center seating means comprises 34% of the seating assembly and each of said two outboard seating means comprises 33% of the seating assembly.

4. The flexible seating system of claim 1, wherein a handle is mounted to said center seating means, whereby said center seating means may be pulled forward.

5. The flexible seating system of claim 1, wherein said displacement means comprises a track.

6. The flexible seating system of claim 1, wherein said displacement means comprises a slide system.

7. The flexible seating system of claim 1, wherein said displacement means comprises a linkage.

8. The flexible seating system of claim 1, wherein said displacement means comprises a roller.

9. The flexible seating system of claim 1, wherein said displacement means comprises a wheel.

10. The flexible seating system of claim 1, wherein said displacement means comprises a bearing system.

11. The flexible seating system of claim 1, wherein each of said seating means may be fixed in a plurality of positions by a securing means.

12. The flexible seating system of claim 11, wherein said securing means comprises a pin mounted on said seating means and said vehicle including a surface having a hole which engages said pin.

13. The flexible seating system of claim 1, wherein said seating means may be displaced by said displacement means and secured in any position between a forward limit and an aft limit.

14. The flexible seating system of claim 1, wherein said seat back is coupled to said seat cushion by a hinge so that said seat back may be folded over said seat cushion in a generally horizontal position.

15. The flexible seating system of claim 14, wherein said seat back has a front cushioned surface and a rear surface.

16. The flexible seating system of claim 15, wherein said rear surface of said seat back provides a work surface.

17. The flexible seating system of claim 15, wherein said rear surface of said seat back provides a container holder.

18. The flexible seating system of claim 15, wherein said rear surface of said seat back provides an arm rest.

19. The flexible seating system of claim 1 further comprising a rear shelf having a front portion and a rear portion coupled by a transverse hinge.

20. The flexible seating system of claim 19, wherein said transverse hinge allows said front portion of said rear shelf to be pivoted out of the way of said seating means as said seating means are displaced in an aft direction.

21. A seating system comprising:
    a split bench seat having a seat bottom having a total width, said bench seat being divided into a center seating means and two outboard seating means, said center seating means comprising at least 34% of said total width of said seat bottom and said outboard seating means each having a substantially equal width that is no greater than 33% of said total width of said seat bottom, each seating means having a seat back and seat cushion; and
    a displacement means coupled to said center seating means, whereby said center means may be moved in a fore and aft direction relative to said outboard seating means.

22. A seating system for a vehicle having a split rear bench seat including a seat cushion and a seat back, comprising:
    means for portioning the split rear bench seat into a center seat having a center seat width, and two outboard seats each having a substantially equal outboard seat width, the center seat width and the outboard seat width being unequal;
    means for displacing each of the seats relative to each other in a fore and aft direction;
    means for securing the seats in a plurality of fore and aft positions; and
    means for pivoting the seat back into a generally horizontal position in facing engagement with the seat cushion.

* * * * *